Sept. 15, 1970     D. G. WORTMAN     3,529,103

TROLLEY POLE RETRACTOR

Filed May 10, 1968     4 Sheets-Sheet 1

INVENTOR:
DARRELL G. WORTMAN

BY *William S. Dorman*

ATTORNEY

INVENTOR:
DARRELL G. WORTMAN

BY William S. Dorman
ATTORNEY

Sept. 15, 1970   D. G. WORTMAN   3,529,103

TROLLEY POLE RETRACTOR

Filed May 10, 1968   4 Sheets-Sheet 3

INVENTOR:
DARRELL G. WORTMAN

BY William S. Dorman
ATTORNEY

Sept. 15, 1970     D. G. WORTMAN     3,529,103
TROLLEY POLE RETRACTOR
Filed May 10, 1968     4 Sheets-Sheet 4
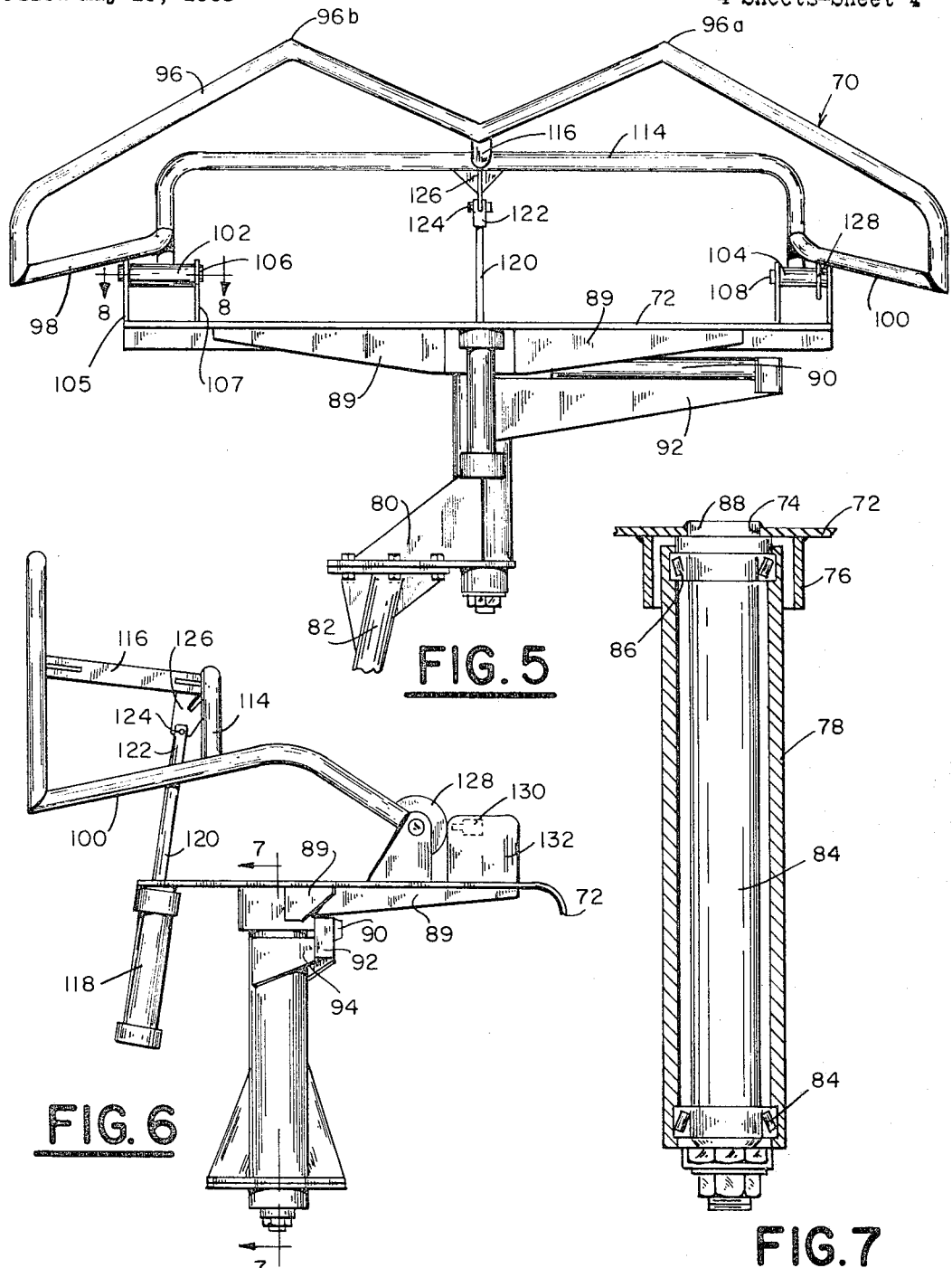
INVENTOR:
DARRELL G. WORTMAN
BY William S. Dorman
ATTORNEY United States Patent Office 3,529,103
Patented Sept. 15, 1970

3,529,103
TROLLEY POLE RETRACTOR
Darrell G. Wortman, Tulsa, Okla., assignor to Unit Rig & Equipment Company, Tulsa, Okla., a corporation of Delaware
Filed May 10, 1968, Ser. No. 728,203
Int. Cl. B60l 5/28
U.S. Cl. 191—50                                    12 Claims

ABSTRACT OF THE DISCLOSURE

A trolley pole retractor for automatically retracting the trolley poles of an electric powered vehicle, and particularly an electric powered rubber tired off-highway vehicle. The retractor device maintains the trolley poles in an efficient engagement with the trolley lines during the operation of the vehicle under the power supplied by the electric current carried by the trolley wires. When it is desired to release the engagement between the poles and the trolley wires, the poles are initially automatically lowered slightly to effect a disengagement from the wires. The poles are then further lowered and simultaneously rotated for moving the poles to a downward and substantially horizontally disposed position. This places the poles in an "out of the way" position with respect to the continued operation of the vehicle under auxiliary power means, and maintains the poles in a disengaged position with respect to the trolley wires.

---

This invention relates to improvements in electric powered vehicles and more particularly, but not by way of limitation, to a trolley pole retractor for automatically lowering and rotating the trolley poles of an electric powered rubber tired off-highway vehicle when it is desired to disengage the trolley poles from the trolley wires.

Electric powered vehicles of many types are in widespread use today, and these vehicles are normally provided with a pair of trolley poles adapted to engage a pair of oppositely charged trolley wires in order to provide the electric power for the operation of the vehicle. Electric powered vehicles of this general type are widely used in mining operations, and the like, and these mining vehicles are normally exceptionally large, rubber tired, off-highway vehicles provided with trolley poles for engaging the trolley lines carrying the electric power or current. As long as the poles are in engagement with the respective wires, the vehicle receives its motive power from the electric current carried by the trolley wires. However, the vehicle is normally disengaged from the wires prior to beginning of a "run" or operation, and at the termination of a "run" or operation. An auxiliary power unit is normally provided for the operation of the vehicle at such times when the trolley poles are not in engagement with the trolley lines and the disengaged poles are often a detriment to the operation of the vehicle by the auxiliary power unit.

It is often difficult to initially engage the poles with the respective wires, and a trolley entry pan such as that disclosed in the co-pending H. C. Doennecke application Ser. No. 721,498, filed Apr. 15, 1968, entitled "Trolley Entry Pan," with which I am familiar, may be used for facilitating this operation. In addition, the usual practice today for disengaging of the poles from the respective trolley wires at the end of a "run" requires that the vehicle operator manually manipulate the poles for disengagement thereof from the line. Subsequent to the disengagement of the poles from the wires, the operator must manually swing the poles aside in some manner to an "out of the way" position. The disadvantages of a manual operation of this type will be apparent.

The present invention contemplates a novel trolley pole retractor for eliminating the necessity for manual disengagement of the poles from the trolley wires. The device is adapted for automatically first lowering the poles through a relatively slight distance to initially disengage the poles from the respective wires. As soon as the poles are thus disengaged, the poles are simultaneously lowered and rotated for moving the poles to a downward or substantially horizontal position, with the poles having been moved or swung to a side position or "out of the way" position for substantially eliminating interference with the operation of the disconnected vehicle when the vehicle is driven by the power supplied from the auxiliary power unit. When it is desired to re-establish the connection between the trolley poles and the respective trolley wires, the device of the present invention functions for elevating the poles to a normal upwardly and angularly extending position, with the angle thereof preferable being slightly greater than the angle which the poles assume in the connected position during the "run". Of course, the trolley entry pan of the aforesaid pending application may be utilized for facilitating the engagement of the poles with the trolley wires, and the poles are maintained in an efficient operating engagement therewith by virtue of the upwardly directed force on the poles in the engaged position thereof.

It is an important object of this invention to provide a novel trolley pole retractor device for facilitating the disengagement of the trolley poles of an electric powered vehicle from the respective trolley wires.

It is another object of this invention to provide a novel trolley pole retractor device particularly designed and constructed for automatically initially lowering the poles a relatively slight distance to provide a disengagement of the poles from the wires.

Another object of this invention is to provide a novel trolley pole retractor device wherein the initially lowered poles are subsequently simultaneously lowered and rotated for moving the poles to a downward and "out of the way" position for substantially precluding interference with the operation of the disconnected vehicle.

A further object of this invention is to provide a novel trolley pole retractor device whereby the disengaged poles may be automatically elevated to a position for engagement with the respective trolley wires.

A still further object of this invention is to provide a novel trolley pole retractor device which maintains the poles in a positive engagement with the respective trolley wires until it is desired to disengage the poles therefrom.

It is a still further object of this invention to provide a novel trolley pole retractor device which is simple and efficient in operation and economical and durable in construction.

Other and further objects and advantageous features of the present invention will hereinafter more fully appear in connection with a detailed description of the drawings in which:

FIG. 5 is a front elevational view of a modified form of trolley pole retractor embodying the invention.

FIG. 6 is a side elevational view of the trolley pole retractor shown in FIG. 5.

FIG. 7 is an enlarged view taken on line 7—7 of FIG. 6.

FIG. 8 is an enlarged view taken on line 8—8 of FIG. 5.

Figure 1:
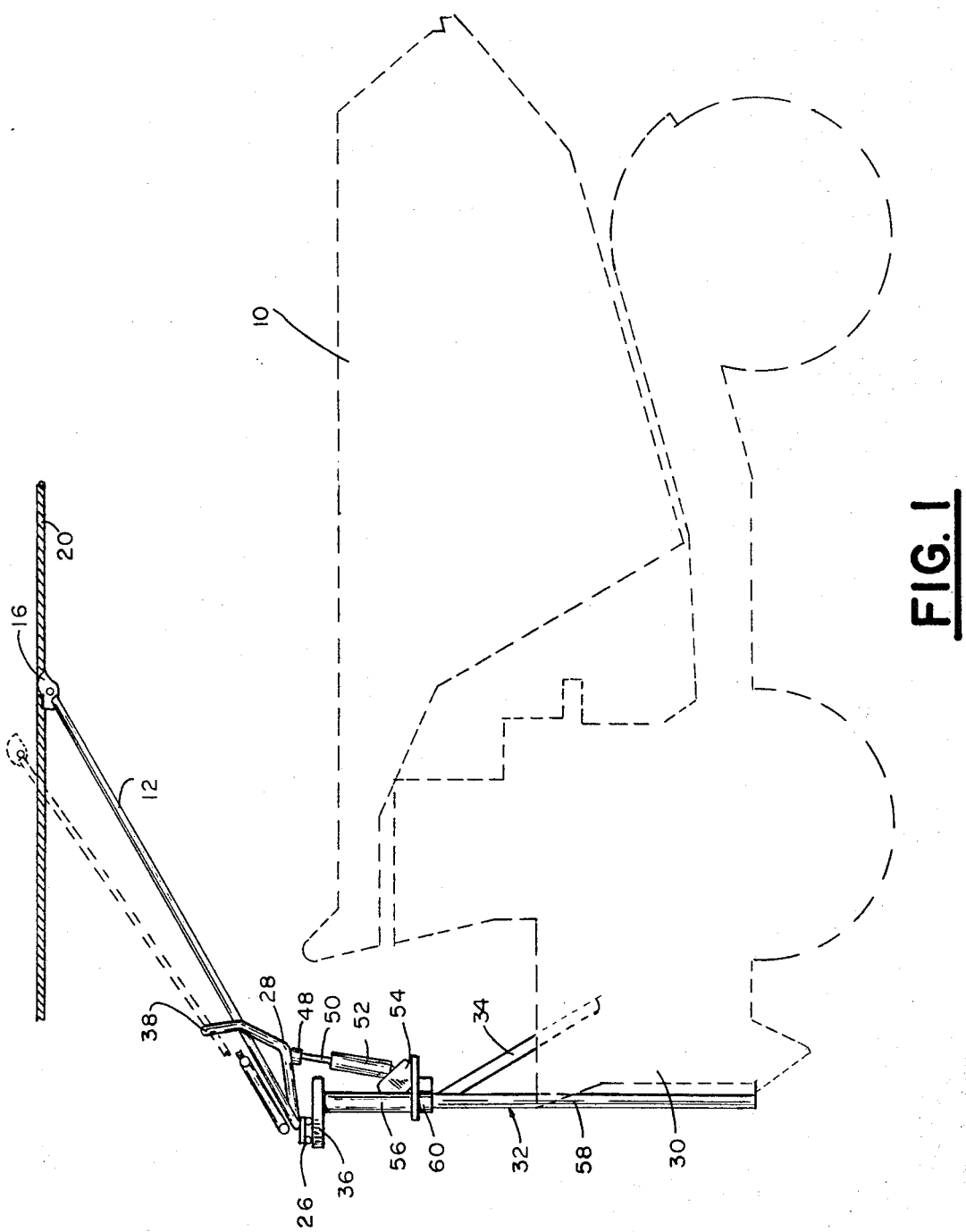
FIG. 1 is a side elevational view of an electric powered vehicle having the trolley poles in the "run" position and having a trolley pole retractor embodying the invention provided thereon, with portions being depicted in dotted lines for purposes of illusutration.
Figure 2:
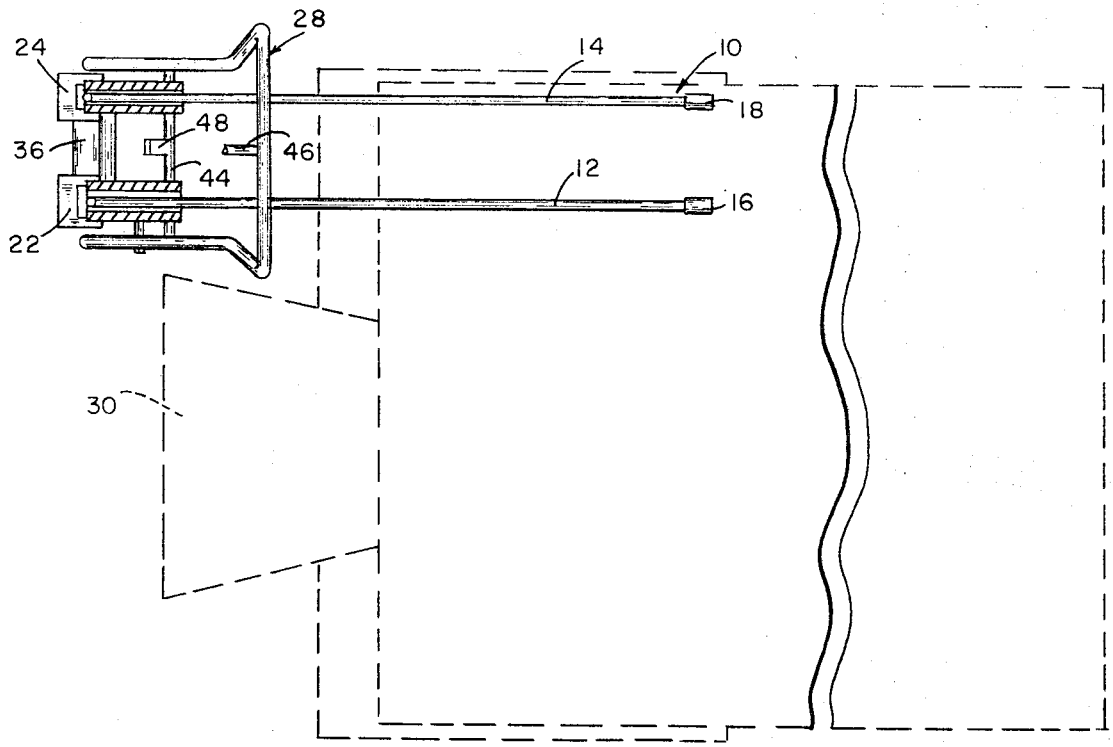
FIG. 2 is a plan view of an electric powered vehicle having the trolley poles in the "run" position and having a trolley pole retractor embodying the invention provided thereon, with portions being depicted in dotted lines for purposes of illustration.
Figure 3:
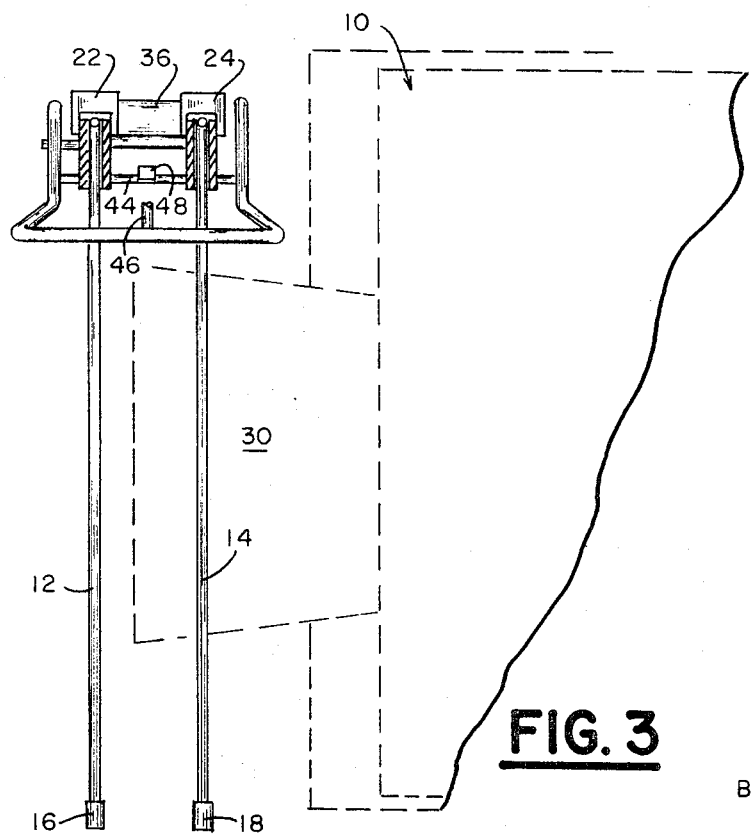
FIG. 3 is a broken view similar to FIG. 2 and depicting the trolley poles in a down position.

Referring to the drawings in detail, and particularly FIGS. 1 through 4, an electric powered vehicle generally indicated at 10 is depicted having a pair of suitable trolley poles 12 and 14 secured thereto in a manner as will be hereinafter set forth. Each trolley pole 12 and 14 is provided with a suitable connector member or shoe 16 and 18, respectively, for engaging a pair of suitable oppositely charged trolley wires 20, only one of which is shown in FIG. 1, to connect the vehicle 10 with a source of electric current during the normal operation of the vehicle. Whereas the particular vehicle 10 depicted herein is of the rubber tired off-highway type as widely used today in mining operations, and the like, the vehicle 10 may be of any suitable type which is powered during normal operating conditions by the electric current received through the trolley poles 12 and 14, as is well known.

The trolley poles 12 and 14 are substantially identical and are each normally pivotally and swivelly mounted at one end in any well known manner to base plate members 22 and 24, respectively. The plates 22 and 24 are in turn mounted on the vehicle 10 in a manner as will be hereinafter set forth, and each of the plates is mounted on suitable insulators as shown at 26 in FIGS. 1 and 4. The pivotal mounting arrangement of the poles 12 and 14 is normally provided with yieldable means, such as a spring, or the like (not shown), for constantly urging the poles toward an upright position for a purpose as will be hereinafter set forth.

The particular embodying of the invention depicted in FIGS. 1 through 4 is a general or broad interpretation of the invention, and the modification of the invention shown in FIGS. 5 through 8 is more specifically illustrated. However, there is no intention of limiting the invention to the exact or precise structures shown herein.

With regard to FIGS. 1 through 4, a trolley pole retractor generally indicated at 28 is secured in the proximity of the leading or forward portion 30 of the vehicle 10. An upright support post 32, or the like, is secured to the portion 30 in any suitable manner (not shown) and provided with suitable brace members such as shown at 34, extending between the support 32 and portion 30 for stabilization of the support member. The post 32 is preferably disposed to one side of the longitudinal centerline of the vehicle 10, as particularly shown in FIG. 4, to reduce interference of the device with the vision of the operator of the vehicle, but of course, the post 32 may be secured at any desired location, whether at the front, side, rear or other location with respect to the vehicle. A plate 36 is rigidly secured to the upper end of the post 32 in any well known manner (not shown) for receiving the trolley base plate members 22 and 24 thereon. As hereinbefore set forth, the trolley base members 22 and 24 are secured to the upper or exposed surface of the plate 36 with the insulators 26 interposed therebetween, as is well known. It is preferable that the spacing between the poles 12 and 14 be approximately two feet, since the usual spacing between the trolley lines 20 is usually approximately two feet, but the poles may be disposed at any desired spacing therebetween.

Figure 4:
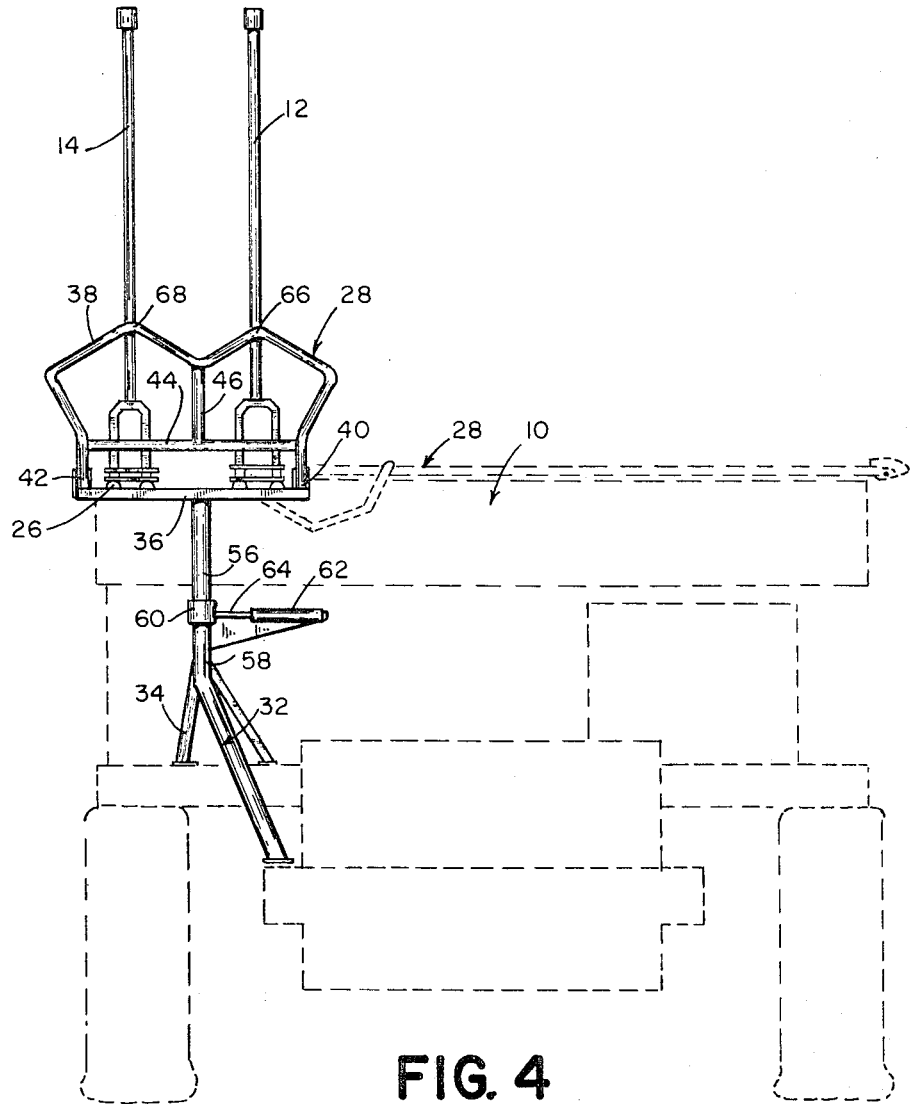
FIG. 4 is a front elevational view of an elevational view of an electric powered vehicle provided with a trolley pole retractor embodying the invention and having the trolley poles in the "run" position shown in solid lines, and the down position thereof shown in dotted lines, with the vehicle also being depicted in dotted lines for purposes of illustration.

A substantially M-shaped rod member 38 is pivotally secured to the plate 36 in such a manner that the spaced opposite ends 40 and 42 thereof have a common axis of rotation. In fact, it is preferable that the axes of rotation of the ends 40 and 42 be in substantially co-axial alignment with the axes of rotation of the poles 12 and 14. A cross bar 44 may be secured between the spaced ends 40 and 42, as shown in FIG. 4, and a strut 46 or the like, may be secured between the cross bar 44 and the center portion of the M-shaped rod, if desired. The outer end 48 of the piston arm 50 of a suitable power cylinder 52 is suitably pivotally secured to the cross bar 44 whereby reciprocation of the piston arm 50 will cause rod 38 to pivot about the axes of the ends 40 and 42 thereof. The cylinder 52 is preferably suitably pivotally secured to a support bracket member 54 which in turn is secured to the rod 32 in any suitable manner (not shown).

Figure 9:
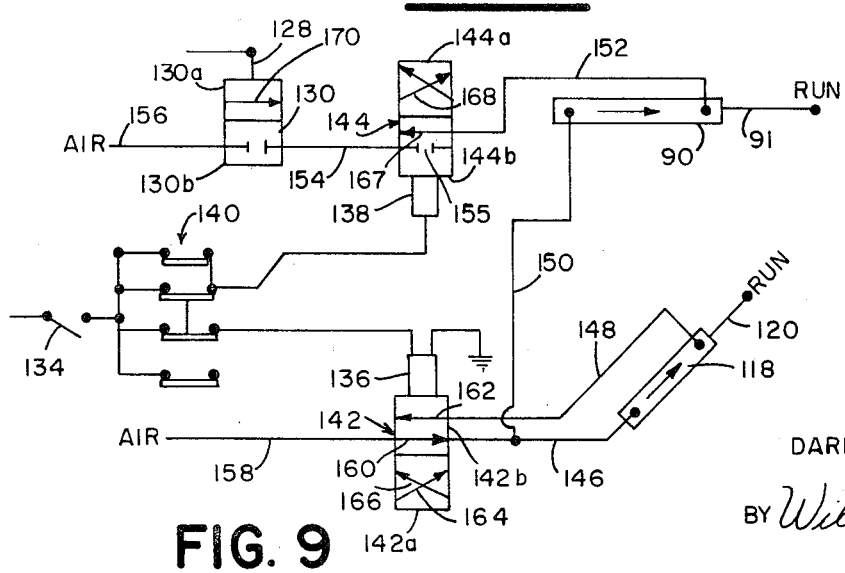
FIG. 9 is a schematic diagram of the operating system for the embodiment of the invention depicted in FIGS. 5 through 8.

The upper portion 56 of the rod 32 is preferably rotatable with respect to the lower portion 58 thereof. This may be accomplished in any well known manner, such as by connecting the members in longitudinal alignment with a suitable bearing member 60 interposed therebetween. The bearing member 60 is preferably disposed below the bracket 54 and cylinder 52 whereby the cylinder 52, plate 36 and members secured to the plate 36 will move simultaneously with the upper portion 56. A second power cylinder 62 may be suitably anchored between the vehicle 10 and the bearing member 60 whereby reciprocation of the piston arm 64 of the cylinder 62 will cause the upper portion 56 to rotate with respect to lower portion 59. The power cylinders 52 and 62 may be of any suitable type, such as pneumatic or hydraulic, and are actuated by a suitable hydraulic or pneumatic system for actuation of the device 28 in a manner as will be hereinafter set forth. The particular valving and circuitry of the system for actuation of the particular embodiment shown in FIGS. 1 through 4 is not shown herein. However, the complete circuit for the embodiment of the invention shown in FIGS. 5 through 8 is shown in FIG. 9, and it will be readily apparent that a similar system may be provided for the embodiment shown in FIGS. 1 through 4.

In the "run" position for the vehicle 10, the poles 12 and 14 are normally retained in an angular upward direction by virtue of the structure of the pivotal connection of the poles 12 and 14 with the respective plates 22 and 24, as hereinbefore set forth. The position of the poles on the plate 36 is preferably such that poles are in substantial alignment with the apex points 66 and 68 of the M-shaped rod 38, and the engagement of the poles 12 and 14 thereagainst limit the uppermost position of the poles 12 and 14 at an angle somewhat greater than the angle of the poles in the engaged position with the wires 20. For example, the uppermost position of the poles, as shown in dotted lines in FIG. 1, may be approximately 40 degrees with respect to the horizontal, but not limited thereto. As the vehicle 10 is moved in the proper direction for engaging the poles with the wires 20, the poles may be engaged with the wires in any well known manner, such as by the use of the trolley entry pan disclosed in the aforementioned H. C. Doennecke application. When the poles 12 and 14 are efficiently engaged with the wire 20, the angular position of the poles, with respect to the horizontal, will be slightly less than the normal uppermost position thereof, as shown in solid lines in FIG. 1. For example, the "run" position may be at an angle of approximately 30 degrees for the poles, but not limited thereto. As hereinbefore set forth, since the poles are normally urged in an upward direction during the "run" operation of the vehicle, an efficient engagement of the shoes 16 and 18 with the wires 20 is assured.

When the vehicle comes to the end of the "run," or when it is desired for any reason to disconnect the shoes 16 and 18 or poles 12 and 14 from the engagement with wires 20, a suitable valve, or the like, in the hydraulic or pneumatic system is suitably activated for retracting the arm 50 of the cylinder 52 through a relatively slight initial angular distance. This pulls the rod 38 in a downwardly direction for engaging the poles 12 and 14 and pulling the poles downwardly with respect to the wires 20 for a disengagement therebetween. Of course, at the end of a trolley line, the wires 20 normally extend upwardly at an angle with respect to the main portion of the line, and when the vehicle is removed from the engagement of the wires 20 at the end of the line, the upward angle of the wires may tend to cause the poles to try to move upwardly to follow the lines. Of course, the engagement between the poles and the rods 38 prevents an upward movement of the poles beyond the uppermost limit established as hereinbefore set forth, thus further facilitating the disconnecting of the poles from the wires.

As soon as the poles 12 and 14 have been lowered a sufficient distance to assure a complete disconnection with respect to the wires 20, a further element in the fluid system is actuated for activating the second cylinder 62. The arm 64 is moved in the proper direction for rotating the upper portion 56 of the support 32 in the proper direction for rotating the poles 12 and 14 toward a direction substantially perpendicular with respect to the longitudinal axis of the vehicle 10. Of course, the arm 50 of the cylinder 52 is further retracted for continuing the lowering of the rod 38 and the poles 12 and 14 engaged thereby. Thus, the poles are simultaneously lowered and rotated toward a substantially perpendicular position with respect to the longitudinal axis of the vehicle. When the poles have reached the lowered and fully rotated position shown in FIG. 3 and as shown in dotted lines in FIG. 4, the fluid system will be shut down for stopping any further movement of the poles. The poles will remain in this "out of the way" position until it is desired to resume the normal "run" position therefor.

When it is desired to resume the "run" position for the poles, the fluid system may be properly actuated for extending the arm 50 of the cylinder 52 and simultaneously moving the arm 64 of the cylinder 62 in the proper direction for rotating the upper portion 56 of the support 32 in an opposite direction from the lowering operation. The extending of the arm 50 moves the rod 38 in an upwardly direction whereby the poles 12 and 14 will be moved upwardly toward the uppermost position thereof. The combined rotation and elevating of the poles 12 and 14 will be continued until the rod 38 is in the uppermost position thereof for retaining the poles in the uppermost position shown in dotted lines in FIG. 1. Of course, as soon as the shoes 16 and 18 are engaged with the wires 20, the angular position of the poles 12 and 14 will be somewhat less, as hereinbefore set forth, and as shown in solid lines in FIG. 1.

Referring now to FIGS. 5 through 8, a trolley pole retractor generally indicated at 70 is shown which is disclosed in more detail than that depicted in FIGS. 1 through 4. In addition, FIG. 9 discloses the fluid circuit for operation of the device 70.

The trolley retractor 70 comprises a base plate structure 72 provided with a substantially centrally disposed aperture 74 and having a sleeve member 76 rigidly secured to the lower surface thereof in any suitable manner and concentrically disposed with respect to the aperture 74. The sleeve 76 extends downwardly from the plate 72, as viewed in the drawings for receiving the upper end of a housing 78 therein as particularly shown in FIG. 7. The housing 78 is rigidly connected with the vehicle 10 in any suitable manner, such as by a bracket member 80, which in turn is rigidly secured to a support brace 82 which is fixedly secured to the vehicle 10 in a manner similar to the support member 32 shown in FIGS. 1 and 4. Of course, it is preferable that the housing 78 be disposed to one side of the longitudinal center of the vehicle 10, as hereinbefore set forth in connection with the device 28, to reduce interference with the vision of the operator or drive of the vehicle.

A rotatable shaft 84 is journalled with the housing 78 in any suitable manner, such as by a pair of spaced bearing members 84 and 86 (FIG. 7). The upper end 88 of the shaft 84 extends axially or longitudinally beyond the housing 78 and through the aperture 74. The end 88 is welded or otherwise rigidly secured in the aperture 74 whereby the plate 72 will be rotatably supported with respect to the housing 78.

A plurality of downwardly extending web members 89 are provided on the lower surface of the plate 72 and extend substantially radially outward from the sleeve 76 to provide rigidity and stability for the plate 72. A power cylinder 90 is suitably connected between the housing 78 and plate 72 in such a manner that the cylinder 90 is journalled at 92 on a support bracket 94 secured to the outer periphery of the housing 78, and the piston arm (not shown) is pivotally secured to one of the ribs or web members 89. Thus, reciprocation of the piston arm causes the plate 72 and shaft 84 to rotate with respect to the housing 78. Of course, the piston arm of the cylinder 90 may be suitably connected to the sleeve 76 rather than the web 89 desired, whereby reciprocation of the piston arm will rotate the sleeve 76 and plate 72.

A substantially M-shaped pole contactor bar 96 extends upwardly from the plates 72 and is provided with a pair of outwardly extending spaced arms 98 and 100 having the outer ends thereof pivotally secured to the plate 72 in any suitable manner. As shown in FIGS. 5 and 8, the arms 98 and 100 are preferably provided with a transversely extending sleeve 102 and 104, respectively, disposed in substantially axial alignment. The sleeves 102 and 104 are journally on aligned pins or trunnions 106 and 108, respectively, in any suitable manner. For example, as shown in FIG. 8, the shaft or trunnion 106 is supported by a pair of spaced apertures upstanding flanges 105 and 107 and a plurality of needle bearings 110 are interposed between the trunnion 106 and sleeve 102, with the bearings being longitudinally spaced apart by means of a suitable bearing sleeve 112, as is well known. Thus, the sleeve 102 will be freely rotatable on the shaft 106.

An inverted substantially U-shaped rod or brace member 114 is rigidly secured between the arms 98 and 100, and may be connected with the M-shaped rod 98 by means of a strap member 116. A power cylinder 118, generally similar to the cylinder 90, is connected with the vehicle 10 in any suitable manner (not shown) and the piston arm 120 thereof is preferably provided with a clevis member 122 which is pivotally secured at 124 to a bracket member 126 secured to the strap member 116. It will be readily apparent that reciprocation of the piston arm 120 causes the arms 98 and 100 and the rod 96 to pivot about the trunnions or pins 106 and 108 for a purpose and in a manner as will be hereinafter set forth.

A cam member 128 is secured to the sleeve 104 of the arm 100 in any suitable manner (not shown) for rotation simultaneously therewith. The outer periphery of the cam 128 is adapted for engagement with a suitable time delay valve 130 contained within a control box 132, or the like which is secured to the plate 72 in any well known manner. The delay valve 130 is operably connected in the fluid operating system for the trolley pole retractor as will be hereinafter set forth.

The poles 12 and 14 are mounted on the plates 72 in a manner similar to that hereinbefore set forth with regard to the plate 36. The poles 12 and 14 are interposed between the spaced arms 98 and 100 and are preferably positioned on the plate 72 in such a manner as to be engaged by the apex points 96a and 96b, respectively, of the M-shaped rod 96, but not limited thereto.

Referring now to FIG. 9, a circuit diagram of the operating system for the trolley pole retractor 70 (or the trolley pole retractor 28) is shown therein. The operating system comprises a suitable off-on electric switch 134 preferably installed or provided in the vehicle for manual actuation by the operator of the vehicle 10. The switch 134 is preferably in operable electrical connection with the electrical system of the vehicle 10. The switch 134 is electrically connected with a pair of similar solenoids 136 and 138 in any suitable manner. As shown herein, a selector switch 140 is interposed between the switch 134 and the solenoids 136 and 138, but it is to be noted that the selector switch 140 may be eliminated if desired. The solenoids 136 and 138 are operably connected with air valves 142, respectively, for actuation thereof as will be hereinafter set forth. The air valve 142 is operably connected to the power cylinder 118 by a line 146 in communication with one end of the cylinder 118, and by a line 148 in communication with the opposite end of the cylinder 118. The valve 142 is also connected with the cylinder 90 through a line 150 in communication with one end of the cylinder 90. The valve 144 is connected with the cylinder 90 by a line 152 which communicates with the opposite end of the cylinder with respect to the line 150. In addition, the valve 144 is connected with the valve 130 through an air supply line 154. Of course, the valve 130 is operably connected with a source of fluid pressure (not shown) through a line 156 as is well known. Similarly, the valve 142 is operably connected with the fluid pressure through a line 158.

Assuming that the selector valve 140 is eliminated, and the switch 134 is directly electrically connected to the solenoids 136 and 138 for simultaneous activation thereof, and further assuming that the trolley poles 12 and 14 are in the fully lowered position as shown in dotted lines in FIG. 4, the operation of the fluid system shown in FIG. 9 is as follows. The switch 134 is manually closed by the operator of the vehicle 10 whereupon the solenoids 136 and 138 are simultaneously energized for energizing the valves 142 and 144, respectively, and with said energized position being depicted in FIG. 9. In this position, air or pressure fluid is directed through the valve 142 in the direction of the arrow 160 and into the line 146. The pressure in line 146 acts on the piston arm 120 of the cylinder 118 for urging or moving the piston arm 120 in an axially outward direction to the fully extended position thereof shown in FIG. 9 and indicated as the "run" position. Simultaneously, the fluid pressure is exhausted from the opposite end of the cylinder 118 through the line 148 and through the valve 142 in the direction indicated by the arrow 162 for exhaust to atmosphere. This causes the M-shaped rod 96 to pivot upwardly about the axis established by the pins 106 and 108. The poles 12 and 14 are constantly urged in an upstanding or upward direction, as hereinbefore set forth, and as the rod 96 elevates, the poles 12 and 14 move upwardly therewith, or follow the upward movement of the rod.

Simultaneously, a portion of the air leaving the valve 142 moves through or is directed through the line 150 to the cylinder 90 and enters the cylinder 90 at a point for urging or moving the piston arm (indicated at 91 in FIG. 9) axially outward to the extended or "run" position shown in FIG. 9. The air or fluid is discharged from the opposite side of the cylinder 90 through the line 152 and is exhausted to atmosphere through the valve 144 in the direction of the arrow 167. Of course, no air or fluid is moving through the valve 144 from the air supply valve 130 since the intake line of the valve 144 is blocked as shown at 155. The outward extension of the piston arm 91 causes the plate 72 to rotate whereby the rod 96 and poles 12 and 14 rotate simultaneously therewith as a unit. This combined rotation movement and upwardly rotating or pivoting movement continues until the poles 12 and 14 are raised into the fully upward postion as shown in dotted lines in FIG. 1 and solid lines in FIG. 2. Of course, suitable stop means (not shown) may be provided in the cylinders 90 and 118 for limiting any further movement of the piston arms 91 and 120 when the desired fully extended positions thereof have been attained.

As hereinbefore set forth, the fully raised position for the poles 12 and 14 is preferably at an angle slightly greater than that required for engagement of the poles with the lines 20. For example, the fully raised angular position of the poles 12 and 14 is preferably approximately forty degrees from the horizontal. When the poles 12 and 14 are brought into engagement with the lines 20 in the usual manner as hereinbefore set forth, the poles will be lowered slightly to angular position of approximately thirty degrees from the horizontal, as shown in solid lines in FIG. 1. This assures an efficient engagement of the poles 12 and 14 with the respective trolley wires 20 during the "run" of the vehicle 10.

When it is desired to release the poles 12 and 14 from the engagement with the trolley wires 20 for any reason, the switch 134 may be manually opened whereby the two solenoids 136 and 138 are de-energized. With the solenoid 136 de-energized, the valve 136 is reversed (superimpose the lower square 142a on the upper square 142b of the valve 142) whereby the flow of air or fluid moves through the valve 142 in the direction of the arrow 164 and into the line 148 for acting against the piston arm 120 in such a manner as to retract the arm into the cylinder 118. The fluid behind the piston arm 120 leaves the cylinder 118 through the line 146 and is exhausted through the valve 142 in the direction of the arrow 166. This causes the rod 96 to start pivoting downwardly about the axis established by the pins 106 and 108, and the poles 12 and 14 are moved simultaneously downward by the engagement of the rod 96 therewith. This initial downward movement of the poles 12 and 14 disengages the poles from the trolley wires.

Of course, the second solenoid 138 is de-energized simultaneously with the solenoid 136, and the valve 144 is reversed (superimpose the upper square 144a over the lower square 144b) whereby the fluid is directed through the valve 144 in the direction of the arrow 168 and through the line 162 for acting on the piston arm 91 to retract the arm into the cylinder 90. The fluid from the cylinder 90 on the opposite side of the piston arm 91 will be discharged through the line 150 and exhausted through the valve 142 in the direction of the arrow 166 to atmosphere. This causes the plate 72 to begin to rotate about the axis of the shaft 84 in a direction opposite from the first rotational direction and simultaneously rotates the rod 96 and poles 12 and 14 in a direction substantially perpendicular to the lowering and raising direction thereof. However, there is a slight time delay between the action of the cylinder 118 and the cylinder 90 whereby the poles 12 and 14 will be initially lowered through a sufficient arc to clear the lines 20 piror to the initiating of the rotation of the poles in the said perpendicular direction.

The time delay is accomplished by the cam operated valve 130 which supplies the air to the valve 144. The cam 128 is normally in a position whereby there is no flow of air through the valve 130 to the valve 144. As hereinbefore set forth, the cam 128 is connected with the rod 96 for rotation simultaneously therewith, and when the rod 98 has pivoted through a sufficiently great arc for clearing the poles 12 and 14 from the trolley wires 20, the cam 128 will be moved sufficiently for opening of the valve 130 (superimpose the upper square 130a over the lower square 130b) whereby the air will flow through the valve 130 in the direction of the arrow 170 and thence through the valve 144 in the direction of the arrow 168 and to the cylinder 90. Thus, a delay will be provided for the retraction of the piston arm 91 with respect to the retraction of the piston arm 120, thus delaying the initiation of the rotation of the poles 12 and 14 in the perpendicular direction.

With the selector switch 140 interposed between the switch 134 and the solenoids 136 and 138, the solenoids 136 and 138 may be energized simultaneously as set forth above or may be independently energized by selecting the desired solenoid through actuation of the switch 140. In this manner it is possible to provide independent lowering or raising of the poles 12 and 14 with respect to the perpendicular rotating thereof, or independent rotating of the poles in the perpendicular direction with respect to the lowering or raising thereof. It is to be noted, however, that all raising, lowering or perpendicular rotating of the poles 12 and 14 is simultaneous, or as a unit.

Whereas the operation of the circiut depicted in FIG. 9 has been set forth in detail with respect to the trolley pole retractor 70 and associated cylinders 90 and 118, it is to be understood that the operation also applies to the trolley pole retractor 28 and associated cylinders 52 and 62.

In addition, during the usual "run" operation of a vehicle such as the vehicle 10, the vehicle veers to the left and right of the exact path established by the trolley wires 20. Of course, the usual trolley poles 12 and 14, being swivelly and pivotally mounted on the vehicle, permit this freedom of movement for the vehicle. It is to be particularly noted that the novel trolley pole retractor device of the present invention is designed and constructed for precluding interference with the normal operation of the trolley poles which permits this flexible movement or freedom of movement for the vehicle 10. Whereas it is preferable that the poles 12 and 14 engage the trolley pole contactor rod member at the apexes of the M, it will be readily apparent that as the path of the vehicle veers from a path parallel or aligned with the trolley wires, the poles will still engage the contactor rod, even though such points of engagement will be removed from the apexes of the M. Thus, the trolley pole device functions efficiently without interfering with the freedom of movement of the vehicle which is normally provided and desirable.

From the foregoing it will be apparent that the present invention provides a novel trolley pole retractor device wherein the trolley poles of an electric powered vehicle are automatically elevated to an initial raised position of a slightly greater angle than the normal "run" position therefor in order to assure an efficient engagement between the poles and the trolley wires during the "run" operation of the vehicle. When the poles are to be disengaged from the trolley wires for any reason, the poles are automatically initially lowered through a sufficient arc or distance for disengaging the poles from the wires and permitting clearance of the poles therefrom. The poles are then further lowered and simultaneously rotated in a direction substantially perpendicular with respect to the lowering direction. The poles are thus lowered into an out-of-the-way position for precluding interference of the operation of the vehicle under the power of the auxiliary power unit.

Whereas the present invention has been described in particular relation to the drawings attached hereto, it should be understood that other and further modifications, apart from those shown or suggested herein, may be made within the spirit and scope of this invention.

What is claimed is:

1. In combination with an electric powered vehicle having a pair of pivotal trolley poles adapted for engagement with a pair of trolley wires, a trolley pole retractor comprising support means carried by the vehicle and pivotal about a substantially vertical axis, trolley pole contactor means pivotally mounted on the support means for rotation about an axis substantially perpendicular to the axis of rotation of the support means, said contactor means being in constant engagement with said trolley poles, powered means operably connected with said support means for pivoting thereof in opposite directions about said vertical axis, powered means operably connected with said contactor means for pivoting thereof in opposite directions for alternate lowering and raising thereof for simultaneously lowering and raising the poles, and powered means coordinating the pivotal action of the support means and contactor means whereby the poles may be moved as a unit for simultaneous rotation in mutually perpendicular directions to provide alternate positions of engagement and disengagement with the trolley wires.

2. In combination with an electric powered vehicle having a pair of pivotal trolley poles adapted for engagement with a pair of trolley wires, a trolley pole retractor as set forth in claim 1 and including selective means whereby the trolley poles may be moved through said combined rotational directions either simultaneously or independently of each other.

3. In combination with an electric powered vehicle having a pair of pivotal trolley poles adapted for engagement with a pair of trolley wires, a trolley pole retractor as set forth in claim 1 and including means providing for initial pivoting of the poles in one direction only for disengagement of the poles from the trolley wires and subsequent rotation of the poles in combined mutually perpendicular directions.

4. In combination with an electric powered vehicle having a pair of pivotal trolley poles adapted for engagement with a pair of trolley wires, a trolley pole retractor as set forth in claim 1 wherein said coordinating means comprises fluid pressure means for automatically controlling the supply of pressure fluid for automatic rotation of the support means and contactor means in coordinated pivotal action for alternately lowering and raising the trolley poles.

5. In combination with an electric powered vehicle having a pair of pivotal trolley poles adapted for engagement with a pair of trolley wires, a trolley pole retractor as set forth in claim 4 wherein said fluid pressure means comprises an off-on switch electrically connected with the vehicle, first air valve means operably connected with the trolley poles for raising and lowering thereof, first solenoid means operably connected between the off-on switch and the first air valve, second air valve means operably connected with the trolley poles for rotation thereon in a direction substantially perpendicular with respect to the raising and lowering thereof, second solenoid means operably connected between off-on switch and the second air valve, air supply valve means operably connected with said second air valve for directing fluid thereto, said solenoids being simultaneously energized by closing of the off-on switch for simultaneously raising and rotating the poles into engagement with the trolley wires, said solenoids being simultaneously de-energized by opening of the off-on switch for simultaneously lowering and rotating the poles out of engagement with the trolley wires, and means cooperating with the air supply valve for delaying the de-energized operation of the said second air valve whereby the poles are initially lowered out of engagement and subsequently simultaneously lowered and rotated to a full down position therefor.

6. In combination with an electric powered vehicle having a pair of pivotally trolley poles adapted for engagement with a pair of trolley wires, a trolley pole retractor as set forth in claim 5 wherein selector switch means is interposed between the off-on switch and the solenoids, said selector switch permitting independent movement of said trolley poles in addition to said simultaneous movement therebetween.

7. In combination with an electric powered vehicle having a pair of pivotal trolley poles adapted for engagement with a pair of trolley wires, a trolley pole retractor as set forth in claim 1 wherein the means for lowering and raising of the contactor means includes a power cylinder connected between the vehicle and the contactor means for automatically rotating the contactor means in alternate upward and downward directions for selected engagement and disengagement of the poles and trolley wires, and said means for pivoting of the support means includes a power cylinder connected between the vehicle and the support means for automatically rotating the support means in opposite directions about said vertical axis for providing a combined rotational movement for said poles during the raising and lowering thereof.

8. A trolley pole retractor for alternately engaging and disengaging a pair of pivotal trolley poles from a pair of trolley lines and comprising a support means rotatable about a substantially vertical axis, pole contactor means pivotally secured to the support means and movable toward alternate raised and lowered positions, said contactor means being in constant engagement with the trolley poles, and means operably connected with said support means and contactor means for providing simultaneous rotation therebetween whereby the trolley poles may be simultaneously raised and rotated in one direction and alternately simultaneously lowered and rotated in an opposite direction to provide alternate engaged and disengaged positions with respect to the trolley lines.

9. A trolley pole retractor as set forth in claim 8 wherein time delay means is provided for delaying the rotation of the trolley poles at the initial lowering thereof whereby said trolley poles may be lowered sufficiently to disengage the trolley lines and subsequently be lowered and rotated simultaneously.

10. A trolley pole retractor as set forth in claim 8 wherein selector switch means is operably connected with the trolley poles whereby the trolley poles may be lowered and raised independently from the rotation thereof as well as simultaneously rotated and raised and lowered.

11. A trolley pole retractor as set forth in claim 8 wherein said rotation means includes a first power cylinder operably secured to the support means for rotation thereof in opposite directions about said vertical axis, second power cylinder means operably connected with said pole contactor means for providing alternate raising and lowering thereof, and fluid pressure means operably connected to said power cylinders for automatic actuation thereof for selectively engaging or disengaging the trolley poles from the trolley lines.

12. A trolley pole retractor as set forth in claim 11 wherein said fluid pressure means comprises an off-on switch electrically connected with a source of electric power, first air valve means operably connected with the first power cylinder for actuation thereof, first solenoid means operably connected between the off-on switch and the first air valve, second air valve means operably connected with the second power cylinder for actuation thereof, second solenoid means operably connected between the off-on switch and the second air valve, air supply valve means operably connected with the first air valve for directing fluid thereto, said solenoids being simultaneously energized by closing of the off-on switch for simultaneously actuating the power cylinders for raising and rotating the trolley poles into engagement with the trolley wires, said solenoids being simultaneously de-energized by opening of the off-on switch for simultaneously lowering and rotating the poles out of engagement with the trolley wires, and means cooperating with the air supply valve whereby the actuation of the first power cylinder in the de-energized operation thereof is delayed in order that the poles are initially lowered out of engagement with the trolley lines and subsequently simultaneously lowered and rotated to a full down position therefor.

References Cited

UNITED STATES PATENTS 1,003,890 9/1911 Eveleth _____ 191—67
1,487,311 3/1924 Bower _____ 191—50

ARTHUR L. LA POINT, Primary Examiner

G. H. LIBMAN, Assistant Examiner

U.S. Cl. X.R.

191—66, 85